US009307103B2

(12) United States Patent
Murai

(10) Patent No.: US 9,307,103 B2
(45) Date of Patent: Apr. 5, 2016

(54) IMAGE DISPLAY CONTROL APPARATUS, IMAGE DISPLAY CONTROL METHOD, AND NON-TRANSITORY STORAGE MEDIUM STORING INSTRUCTIONS EXECUTABLE BY IMAGE DISPLAY CONTROL APPARATUS

(71) Applicant: Suzuyo Murai, Nagoya (JP)

(72) Inventor: Suzuyo Murai, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/229,017

(22) Filed: Mar. 28, 2014

(65) Prior Publication Data

US 2014/0293349 A1  Oct. 2, 2014

(30) Foreign Application Priority Data

Mar. 29, 2013  (JP) ................................. 2013-071953

(51) Int. Cl.
*G06F 3/12*  (2006.01)
*H04N 1/00*  (2006.01)

(52) U.S. Cl.
CPC ......... *H04N 1/00408* (2013.01); *H04N 1/0023* (2013.01); *H04N 1/0044* (2013.01); *H04N 1/00442* (2013.01)

(58) Field of Classification Search
None
See application file for complete search history.

(56) References Cited

U.S. PATENT DOCUMENTS

| 2010/0174993 | A1* | 7/2010 | Pennington ........... G06F 1/1616 715/738 |
| 2011/0128389 | A1* | 6/2011 | Maeda et al. ............... 348/207.1 |
| 2012/0044266 | A1 | 2/2012 | Mori |
| 2014/0109012 | A1* | 4/2014 | Choudhary et al. .......... 715/838 |

FOREIGN PATENT DOCUMENTS

| JP | 2012-043109 A | 3/2012 |
| JP | 2012-236284 A | 12/2012 |

* cited by examiner

*Primary Examiner* — John Wallace
(74) *Attorney, Agent, or Firm* — Scully, Scott, Murphy & Presser, P.C.

(57) ABSTRACT

An image display control apparatus includes: a storage storing data sets; and a controller. The controller displays a first screen containing at least two of first data relating images corresponding to the data sets. When a first operation is accepted during display of the first screen, the controller replaces the first screen with a second screen containing at least three of second data relating images corresponding to the data sets. At least one second data relating image is displayed with information indicating that its corresponding data is set as data to be output. Each second data relating image has a display area smaller than that of each first data relating image. The number of second data relating images on the second screen is greater than that of first data relating images on the first screen.

16 Claims, 8 Drawing Sheets

FIG.2A <IMAGE DATA IN MEMORY CARD>
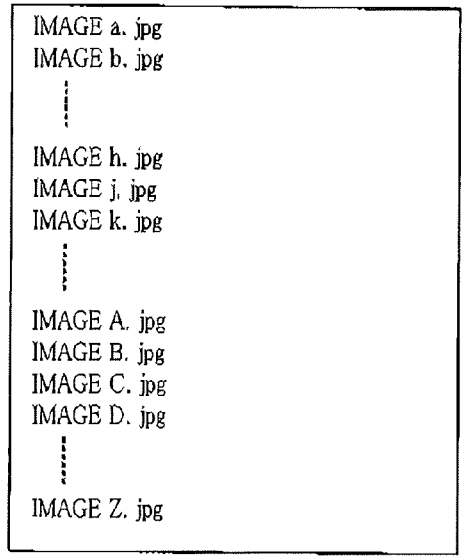
FIG.2B <IMAGE SELECTION SCREEN (3 COLUMNS AND 1 ROW)>
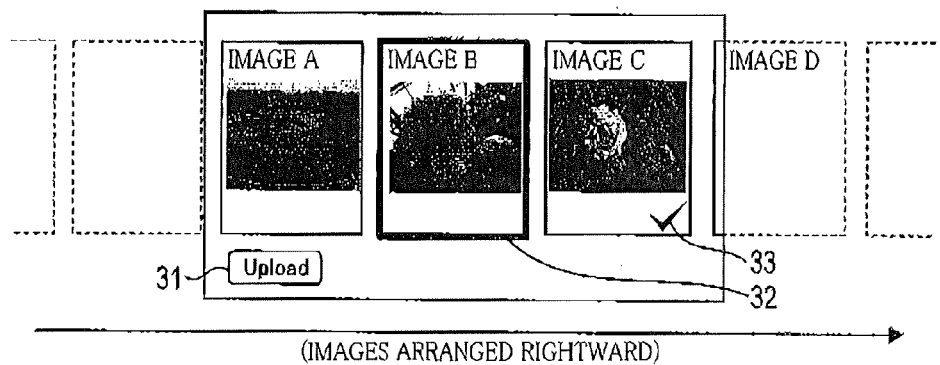
(IMAGES ARRANGED RIGHTWARD)
FIG.2C <SMALL-ICON TABLE SCREEN (X3 COLUMNS AND Y3 ROWS, EX. 11 COLUMNS AND 5 ROWS)>
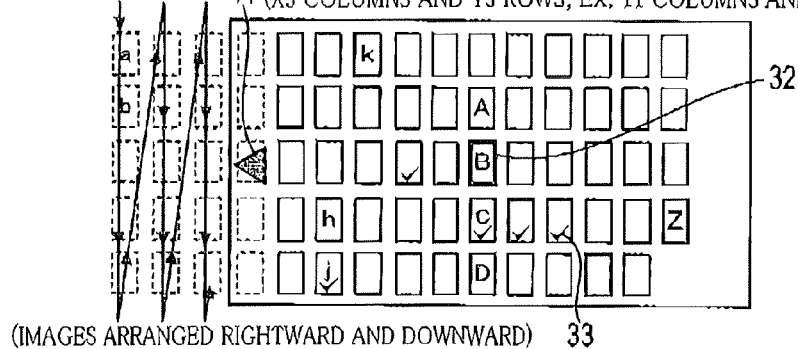
(IMAGES ARRANGED RIGHTWARD AND DOWNWARD)

IMAGE DISPLAY CONTROL APPARATUS, IMAGE DISPLAY CONTROL METHOD, AND NON-TRANSITORY STORAGE MEDIUM STORING INSTRUCTIONS EXECUTABLE BY IMAGE DISPLAY CONTROL APPARATUS

CROSS REFERENCE TO RELATED APPLICATION

The present application claims priority from Japanese Patent Application No, 2013-071953, which was filed on Mar. 29, 2013, the disclosure of which is herein incorporated by reference in its entirety.

BACKGROUND OF THE INVENTION

1. Field of the Invention

The present invention relates to an image display control apparatus, an image display control method, and a non-transitory storage medium storing a plurality of instructions executable by a computer of the image display control apparatus.

2. Description of the Related Art

There are known various devices each capable of reading image data (representative of photographs, for example) from a storage medium or a storage device such as a memory card. Some of such devices allow a user to select one or a plurality of desired sets of image data from a lot of sets of image data stored in the storage medium or the storage device to print the selected image data or upload the selected image data to a server. One example of such devices is a multi-function peripheral (MFP) having a plurality of functions such as a printing function and a scanning function.

Each of such devices typically includes a display device with a touch panel for allowing the user to select desired image data. Specifically, the display device displays images based on some of a lot of sets of image data and accepts, e.g., a touch operation of the user for selecting a desired image or images. Each image selected by the user is displayed with a predetermined mark or other similar information indicating that the image has been selected. The user can change the images displayed on the display device with a flick operation, for example.

SUMMARY OF THE INVENTION

In order for the user to identify the images, relatively large images need to be displayed when the user selects one or some of the images displayed on the display device. However, the larger images limit the number of images displayable on the display device at a time. Also, the number of images displayable on the display device at a time depends upon the size of the display device.

In many cases, accordingly, the display device can display only some images at a time among the sets of image data. In these cases, the user needs to select desired images while scrolling the images with the flick operation, but in a case where the user wants to make a final check on which images have been selected, the user has to scroll the images back to positions of the selected images by repeating the flick operations.

A length of time required for such a check increases with an increase in the number of images and a decrease in the number of images displayable on the display device at a time, and the longer time required for such a check may impose a great burden on the user. In particular, this problem becomes more noticeable in a device such as the MFP including a display device not having enough display area.

This invention has been developed to provide a technique in which even if the number of sets of selectable data is greater than the number of images displayable on a display device at a time, a user can select images displayed on the display device to select desired data and can easily and speedily check the selected data.

The present invention provides an image display control apparatus including: a storage configured to store a plurality of sets of data; a user-input accepting device configured to accept a user input; and a controller. The controller is configured to execute: a first-screen display processing in which the controller controls a display device to display a first screen on which at least two of a plurality of first data relating images respectively corresponding to the plurality of sets of data stored in the storage are arranged, in a set order; a data setting processing in which, when at least one first data relating image of the plurality of first data relating images being displayed on the first screen is selected using the user-input accepting device, the controller performs one of setting, as data to be output, data corresponding to the selected at least one first data relating image and excluding, from the data to be output, the data corresponding to the selected at least one first data relating image; and a second-screen display processing in which, when a first operation is accepted by the user-input accepting device during display of the first screen, the controller controls the display device to replace the first screen with a second screen on which at least three of a plurality of second data relating images respectively corresponding to the plurality of sets of data stored in the storage are arranged in the set order, at least one second data relating image of the plurality of second data relating images being displayed with information indicating that data corresponding to the at least one second data relating image is set as the data to be output, the plurality of second data relating images each including a display area which is less in size than that of each of the plurality of first data relating images, the number of the at least three of the plurality of second data relating images to be displayed on the second screen being greater than that of the plurality of first data relating images to be displayed on the first screen.

The present invention also provides an image display control method for an image display control apparatus. The image display control apparatus includes a storage configured to store a plurality of sets of data; and a user-input accepting device configured to accept a user input. The image display control method includes: controlling a display device to display a first screen on which at least two of a plurality of first data relating images respectively corresponding to the plurality of sets of data stored in the storage are arranged in a set order; when at least one first data relating image of the plurality of first data relating images being displayed on the first screen is selected using the user-input accepting device, performing one of setting, as data to be output, data corresponding to the selected at least one first data relating image and excluding, from the data to be output, the data corresponding to the selected at least one first data relating image; and when a first operation is accepted by the user-input accepting device during display of the first screen, controlling the display device to replace the first screen with a second screen on which at least three of a plurality of second data relating images respectively corresponding to the plurality of sets of data stored in the storage are arranged in the set order, at least one second data relating image of the plurality of second data relating images being displayed with information indicating that data corresponding to the at least one second data relating image is set as the data to be output, the plurality of second data relating images each including a display area which is less in size than that of each of the plurality of first data relating images, the number of the at least three of the plurality of second data relating images to be displayed on the second screen being greater than that of the plurality of first data relating images to be displayed on the first screen.

The present invention also provides a non-transitory storage medium storing a plurality of instructions executable by a computer of an image display control apparatus. The image display control apparatus includes: a storage configured to store a plurality of sets of data; and a user-input accepting device configured to accept a user input. The plurality of instructions, when executed by the computer, cause the image display control apparatus to execute: a first-screen display processing in which the controller controls a display device to display a first screen on which at least two of a plurality of first data relating images respectively corresponding to the plurality of sets of data stored in the storage are arranged in a set order; a data setting processing in which, when at least one first data relating image of the plurality of first data relating images being displayed on the first screen is selected using the user-input accepting device, the controller performs one of setting, as data to be output, data corresponding to the selected at least one first data relating image and excluding, from the data to be output, the data corresponding to the selected at least one first data relating image; and a second-screen display processing in which, when a first operation is accepted by the user-input accepting device during display of the first screen, the controller controls the display device to replace the first screen with a second screen on which at least tree of a plurality of second data relating images respectively corresponding to the plurality of sets of data stored in the storage are arranged in the set order, at least one second data relating image of the plurality of second data relating images being displayed with information indicating that data corresponding to the at least one second data relating image is set as the data to be output, the plurality of second data relating images each including a display area which is less in size than that of each of the plurality of first data relating images, the number of the at least three of the plurality of second data relating images to be displayed on the second screen being greater than that of the plurality of first data relating images to be displayed on the first screen.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 2A is a view for explaining an arrangement of sets of image data stored in a memory card; FIG. 2B is a view for explaining an image selection screen to be displayed on a display device, and FIG. 2C is a view for explaining an icon table screen (in this example, an small-icon table screen) to be displayed on the display device;

DETAILED DESCRIPTION OF THE EMBODIMENTS

Hereinafter, there will be described embodiments of the present invention by reference to the drawings. It is to be understood that the following embodiments are described only by way of example, and the invention may be otherwise embodied with various modifications without departing from the scope and spirit of the invention. Also, the configuration and processings in the following embodiment may be partly omitted, and some or all of the embodiments and modifications may be combined with each other.

(1) Structure of MFP

Figure 1A:
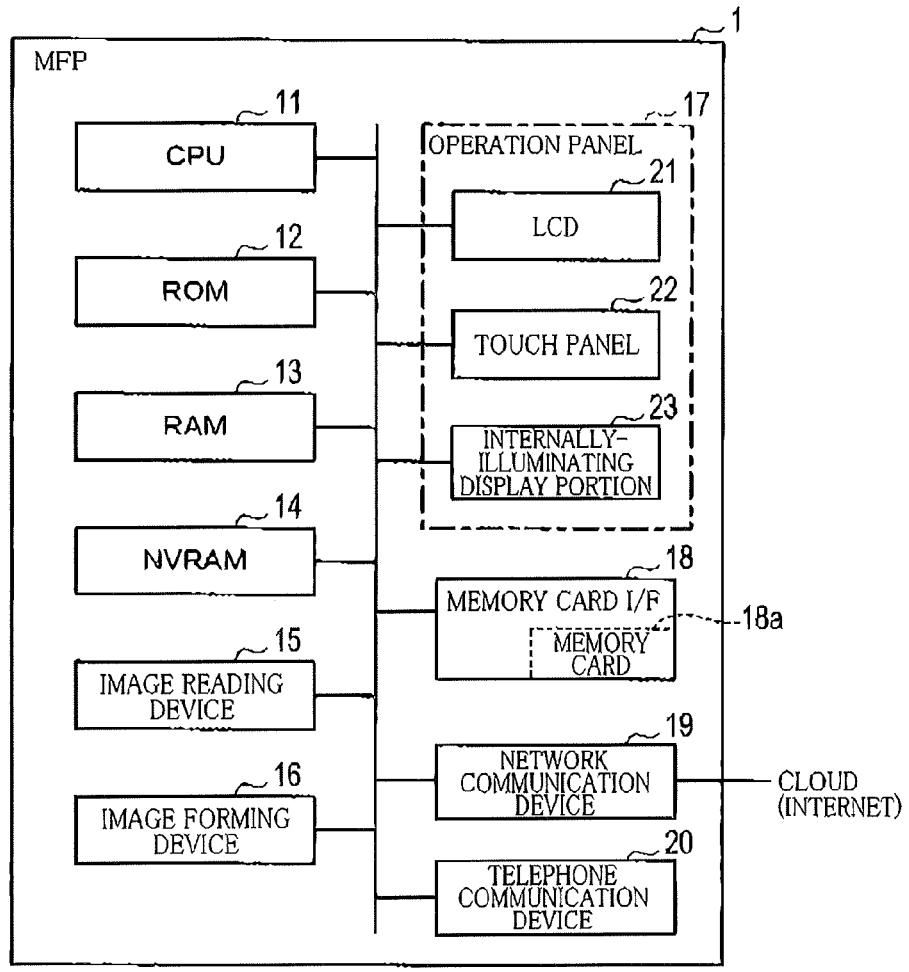
FIG. 1A is a block diagram illustrating a general structure of a multi-function peripheral (MFP) according to one embodiment.

As illustrated in FIG. 1A, a multi-function peripheral (MFP) 1 as one example of an image display control apparatus according to the present embodiment includes a CPU 11 as one example of a controller, a ROM 12, a RAM 13, a non-volatile RAM (NVRAM) 14, an image reading device 15, an image forming device 16, an operation panel 17, a memory card interface (IN) 18, a network communication device 19, and a telephone communication device 20.

The CPU 11 controls components of the MFP 1 according to various programs stored in the ROM 12 and the NVRAM 14. The RAM 13 is used, e.g., as a main memory which is accessed directly from the CPU 11. The NVRAM 14 is a non-volatile memory in which data stored therein can be electrically rewritable and which stores various kinds of data and various programs such as a firmware.

The image reading device 15 includes an image sensor for reading an image recorded on a document and creates image data representative of the image read by the image sensor. The image forming device 16 records an image on a recording medium in the form of a recording sheet. The network communication device 19 is constituted by a network interface card and other related components. The telephone communication device 20 is constituted by a modem and other related components and used when phone or facsimile communication is performed via a telephone line, not shown.

The memory card I/F 18 is an interface on which a memory card 18a as one example of a storage can be mounted. The memory card I/F controls writing or reading of data on or from the memory card 18a. In the following explanation, it is assumed that the memory card 18a storing a plurality of sets of image data, e.g., JPG data (see FIG. 2A) is mounted on the memory card UP 18.

Figure 1B:
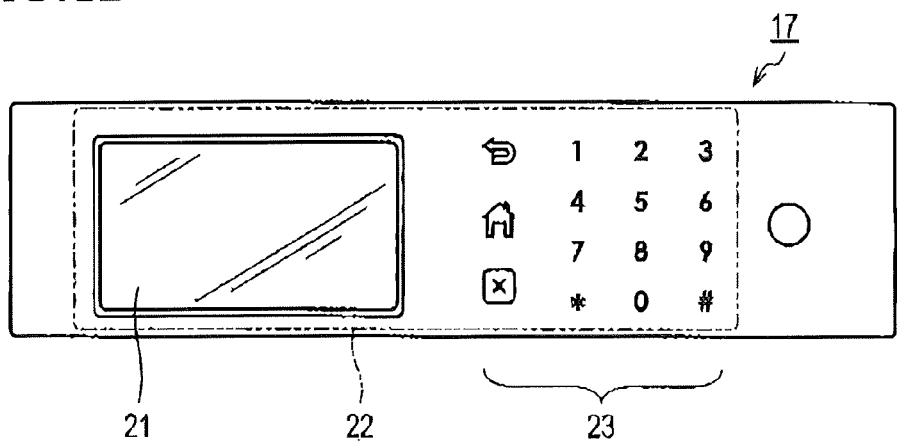
FIG. 1B is a plan view of an operation panel.

The operation panel 17 is constituted by a liquid crystal display (LCD) 21 as one example of a display device, a touch panel 22 as one example of a user-input accepting device, and an internally-illuminating display portion 23 which are disposed in an arrangement illustrated in FIG. 1B. The LCD 21 can display various kinds of information such as functions of the MFP 1 and its operating state. Upon execution of a data upload function, the LCD 21 displays a portion or an entirety of each of some of the images representative of the data stored in the memory card 18a mounted on the memory card I/F 18. Upon execution of a photo printing function, the LCD 21 displays some or all of the images representative of the data stored in the memory card 18a mounted on the memory card I/P 18.

The data upload function is a function for uploading data from the MFP 1 to a predetermined server on the Internet or a cloud server. The photo printing function is a function for causing the image forming device 16 to print an image based on image data, for example, in the MG format. In the present embodiment, since the plurality of sets of image data are stored in the memory card 18a, the LCD 21 displays the images representative of the plurality of sets of image data upon execution of the data upload function and the photo printing function.

The touch panel 22 is a transparent input device shaped like a film which can detect a touch (contact) or a press of a user with an input object such as his or her finger or a stylus. The touch panel 22 is integrally superposed on display surfaces of the LCD 21 and the internally-illuminating display portion 23. The internally-illuminating display portion 23 illuminates an area on which are displayed images representative of numeric keys and other operating buttons.

When the user has touched the touch panel 22 with the input object (that is, when a contact of the input object is detected by the touch panel 22), a contact detection signal representing coordinates of a position of the contact is transmitted from the touch panel 22 to the CPU 11. Based on this contact detection signal, the CPU 11 detects a type of a contact operation or a gesture of the input object and an operated position at which the input object has touched the touch panel 22. Specifically, the CPU 11 can detect the operated position and the contact operation such as tapping, flicking, pinching in, and pinching out. In the following explanation, the contact operation performed by the user with the input object means a contact operation performed on a portion of the touch panel 22 which is superposed on the LCD 21, unless otherwise required by context.

(2) Overview of Operation for Selecting Image Data (2-1) Arrangement of Sets of Image Data As described above, the memory card 18a stores the plurality of sets of image data in the present embodiment. Specifically, as illustrated in FIG. 2A, the memory card 18a stores sets of image data respectively representing an image a, an image b, . . . , an image h, an image j, an image k, . . . , an image A, an image B, an image C, an image D, . . . , and an image Z. When reading the image data from the memory card 18a, the CPU 11 of the MFP 1 reads or recognizes the image data in this order (hereinafter may be referred to as "order of data arrangement" or "data arrangement order"). In other words, the order numbers are sequentially assigned to the respective sets of image data. Also, when displaying screens which will be described below, the CPU 11 sets, e.g., an order of displaying the images (hereinafter may be referred to as "display order") on a base of this data arrangement. It is noted that the data arrangement may be set by the user as needed, for example, the sets of data may be sorted alphabetically or by creation date of data. The data arrangement in FIG. 2A starting from the image a and ending with the image Z is merely one example.

(2-2) Image Selection Screen

After the MFP 1 is turned on, when the user has operated the MFP 1 to start the data upload function, an image selection screen (as one example of a first screen) as illustrated in FIG. 2B is displayed on the LCD 21. The image selection screen is a screen on which the user selects image data to be uploaded. The image selection screen contains a predetermined number of images as one example of a plurality of first data relating images (three images in the present embodiment) among the images corresponding to the image data stored in the memory card 18a. Specifically, the three images are displayed in a layout (as one example of a display layout) of three columns and one row. An Upload button 31 is displayed on a left lower portion of the image selection screen.

It is noted that while the image A, the image B, and the image C are illustrated in FIG. 2B, the images displayed at the start of the data upload function are not limited to these three images and may be any images which are determined as needed as default or by the user, for example.

The images displayed on the image selection screen are images based on which the user can identify corresponding image data. Specifically, each image displayed on the image selection screen is an image created by reducing the size of the image based on the image data. Thus, by viewing the image on the image selection screen, the user can easily recognize the image based on the image data. FIG. 2B illustrates one example in which the image selection screen contains reduced-size images of the images A-C based on the images data.

The order in which the three images are arranged corresponds to the arrangement of the image data stored in the memory card 18a, and the three images are arranged from the left side to the right side of the screen in the order of the data arrangement. FIG. 2B illustrates the image A, the image B, and the image C being arranged in this order from the left side to the right side of the screen.

Also in a case where the memory card 18a stores data in various formats other than the image data such as data in the TXT, PDF, DOC, or MP3 format, the image selection screen may contain images representative of data which can be selected by the user. Specifically, in a case where the data stored in the memory card 18a is data based on which preview images can be displayed, the preview image may be displayed to allow the user to recognize the data. Also, even in a case where the data stored in the memory card 18a is data based on which, even preview images cannot be displayed, images indicative of the data may be displayed in various forms to allow the user to recognize the data. For example, the LCD 21 may display each image having the name of the data on a white background. That is, data which can be used in the present invention is not limited to image data and may be any kind of data.

A central area of the image selection screen is set as a temporary position as one example of a first reference position. An image located at this temporary position is set as a temporary image and displayed with a temporary image border or frame 32. In the present embodiment, one of the three displayed images which is located at the center is set as the temporary image and displayed with the temporary image border 32.

When the user wants to instruct the LCD 21 to display an image based on image data which is before or in front of the image A in the order of the data arrangement among all the sets of image data, the user only needs to perform a flick operation (as one example of an image switch operation) on a specific area of a screen in a right direction. When the flick operation is performed in the right direction, the display or the images on the screen are scrolled in the right direction as a whole, and the displayed images are switched to images located on the left of the image A, i.e., images in front of or ahead of the image A in the order of the data arrangement. On the other hand, when the user wants to instruct the LCD 21 to display an image based on image data which is after or at a rear of the image C in the order of the data arrangement, the user only needs to perform a flick operation on a specific area of the screen in a left direction. When the flick operation is performed in the left direction, the display on the screen is scrolled in the left direction as a whole, and the images to be displayed are switched to images located on the right of the image C, i.e., images at a rear of or behind the image C in the order of the data arrangement.

That is, in a state in which the image selection screen illustrated in FIG. 2B is displayed, it is possible to assume that the images based on the image data are arranged in the right direction in the order of the data arrangement. The LCD 21 displays the image selection screen containing three images located at predetermined positions among the images arranged in the order of the data arrangement.

The user can tap the input object on a desired image displayed on the image selection screen to select or set image data representative of the desired image as image data to be uploaded. A check mark (selected mark) 33 is displayed on the image or images selected by the tap operation of the user (as one example of a reference-position changing operation). That is, the check mark 33 allows the user to visually recognize whether the image is being selected or not. When the user has tapped on the selected image, the state of the image is switched from the selected state to an unselected state, so that the check mark 33 is removed.

When the user has tapped on the Upload button 31 displayed on the image selection screen, the selected image data is transmitted from the network communication device 19 to the cloud and uploaded to the server on the cloud.

While FIG. 2B illustrates the image selection screen upon execution of the data upload function by way of example, a screen similar to the image selection screen is displayed upon execution of the photo printing function. In this case, a Print button is displayed instead of the Upload button 31. During execution of the photo printing function, the user can select or unselect the image data in the same manner as performed during execution of the data upload function. When the user has tapped on the Print button, an image based on the selected image data is printed by the image forming device 16.

(2-3) Icon Table Screen

In the image selection screen illustrated in FIG. 2B, as described above, the user can select desired image data while viewing the images and scrolling the images as needed. In a case where the user wants to check a selected state (as to which image data is being selected or how many sets of image data are being selected, for example) during the selection of the image data, the use can check the selected state by repeatedly scrolling the images to display a desired image on the image selection screen again. In this method, however, a length of time required for the check of the selected state increases with an increase in the number of sets of the image data, resulting in deterioration of the usability of the MFP 1.

To solve this problem, the screen displayed on the LCD 21 can be switched to an icon table screen (as one example of a second screen) with a simple operation in the present embodiment in order to allow the user to easily recognize the selected state. Specifically, in the present embodiment, when the user has performed a pinch-in operation (as one example of a first operation) on a specific area of the image selection screen illustrated in FIG. 2B, that is, when the user has pinched in with his or her fingers on a specific area of the image selection screen, the display on the LCD 21 is switched to the icon table screen.

In the present embodiment, screens set as the icon table screen (see FIG. 3) include a large-icon table screen, a medium-icon table screen, and a small-icon table screen. The selected state of the image data, an operation of user, and so on determine which icon table screen is to be displayed. FIG. 2C illustrates one example of the small-icon table screen.

On the small-icon table screen illustrated in FIG. 2C, rectangular icons (as one example of a plurality of second data relating images) based on the respective sets of image data are displayed in a layout of X3 columns and Y3 rows. In the present embodiment, the X3 and the Y3 are eleven and five, respectively, that is, the icons based on the image data are displayed in a layout of eleven columns and five rows.

Figure 3:
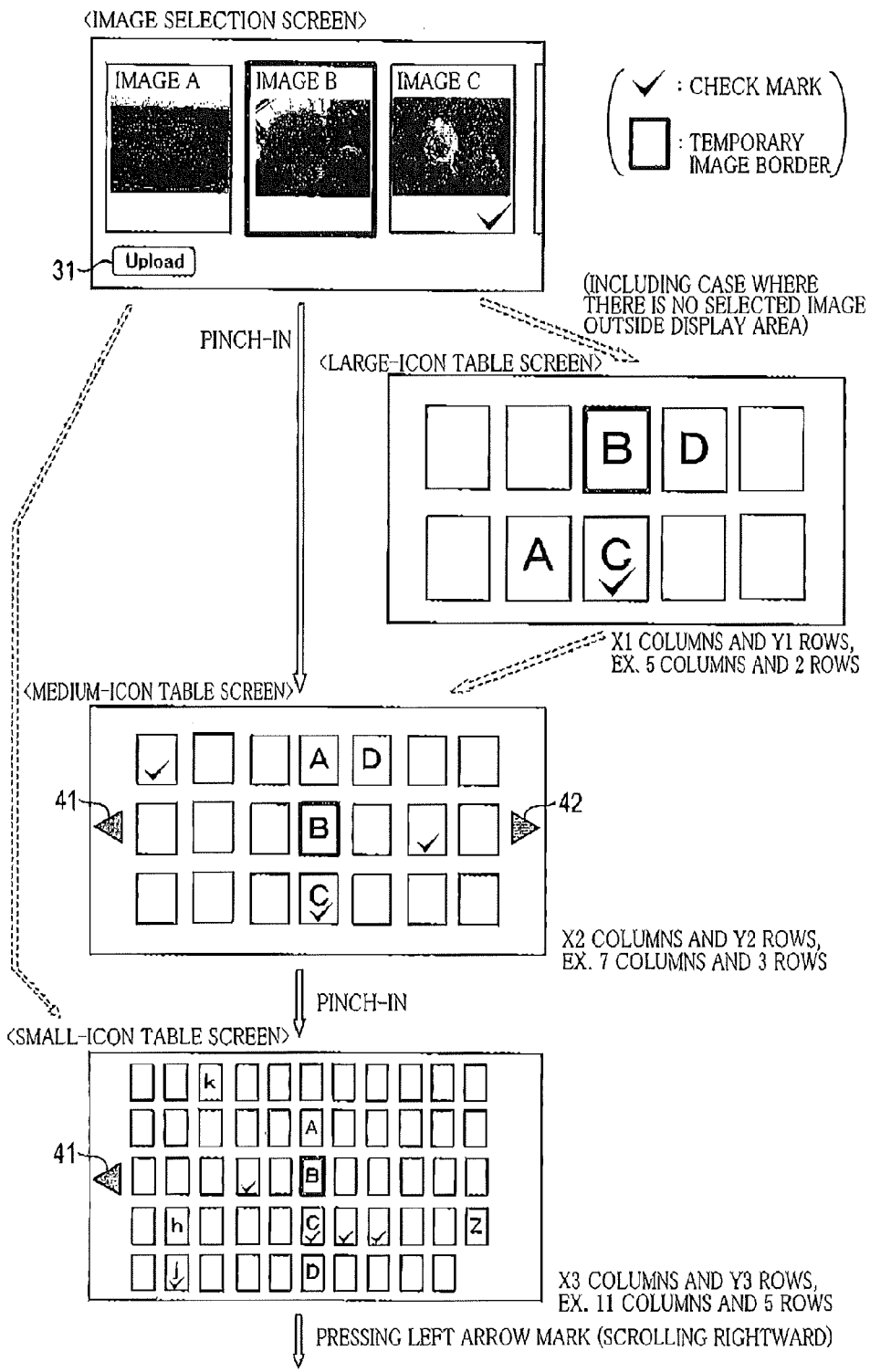
FIG. 3 is a view for explaining one example of a transition from the image selection screen to the icon table screen.

On the large-icon table screen as illustrated as the second screen from the top in FIG. 3, icons based on the respective sets of image data are displayed in a layout of X1 columns and Y1 rows. In the present embodiment, the X1 and the Y1 are five and two, respectively, that is, the icons based on the image data are displayed in a layout of five columns and two rows. On the medium-icon table screen as illustrated as the third screen from the top in FIG. 3, icons based on the respective sets of image data are displayed in a layout of X2 columns and Y2 rows. In the present embodiment, the X2 and the Y2 are seven and three, respectively, that is, the icons based on the image data are displayed in a layout of seven columns and three rows.

The order of arrangement of the icons displayed on the icon table screen corresponds to the arrangement of the image data stored in the memory card 18a. The icons displayed on the icon table screen are arranged in the order of the data arrangement from the left side to the right side of the screen and from the upper side to the lower side of the screen.

Each icon displayed on the icon table screen has a size (i.e., a display area) smaller than that of each image displayed on the image selection screen (FIG. 2B), and accordingly an amount of information of each icon is smaller than that of each image displayed on the image selection screen. In the present embodiment, each icon is not an image directly representing the detail of corresponding image data but a simple image common to all the icons. Thus, the user cannot visually recognize correspondences between the icons and the image data directly on the icon table screen. It is noted that alphabets respectively indicating corresponding images are displayed on some icons on each icon table screen in FIGS. 2C and 3, but these alphabets are displayed for easier understanding purposes and not displayed on the screen in reality.

In each icon table screen, a predetermined position near a central area of the screen is set as a temporary position (as one example of a second reference position) on which an icon representative of a temporary image is displayed with the temporary image border 32. Thus, in a case where the pinch-in operation is performed by the user in the state in which the image selection screen illustrated in FIG. 2B is displayed (that is, in the state in which the image B is being selected as the temporary image), and the screen is switched to the small-icon table screen in FIG. 2C, an icon corresponding to the image B is displayed, with the temporary image border 32, at the temporary position on the central area of the small-icon table screen. That is, when the screen is switched to the small-icon table screen, the user can recognize that the icon with the temporary image border 32 corresponds to the image B displayed on the image selection screen.

On the icon table screen, the check mark 33 is added to or displayed on an icon corresponding to image data being in the selected state. That is, in the icon table screen, though the user cannot directly recognize the detail of the image data by viewing each icon, the user can recognize whether the image data corresponding to the icon is in the selected state or not.

Fifty-five icons can be displayed at a time on the small-icon table screen illustrated in FIG. 2C, but the number of the sets of image data stored in the memory card 18a is larger than fifty five in the present embodiment, and accordingly all the icons based on the image data cannot be displayed at a time. In a case where the user wants to instruct the LCD 21 to display an icon representative of image data not displayed on the screen, the user can scroll the screen by the flick operation in the right or left direction or the tap operation on one of arrow marks displayed on end portions of the screen in the right and left direction.

The small-icon table screen illustrated in FIG. 2C contains icons respectively corresponding to a plurality of sets of image data arranged from certain image data between the first image data and the last image data, to the last image data in the order of the data arrangement among all the sets of image data. A left arrow mark 41 is displayed at a left end portion of the screen. When the user has performed the flick operation in the right direction or the tap operation on the left arrow mark 41 in this state, the images are scrolled in the right direction, so that the LCD 21 displays an icon corresponding to image data representative of the first image a in the order of the data arrangement.

Figure 4:
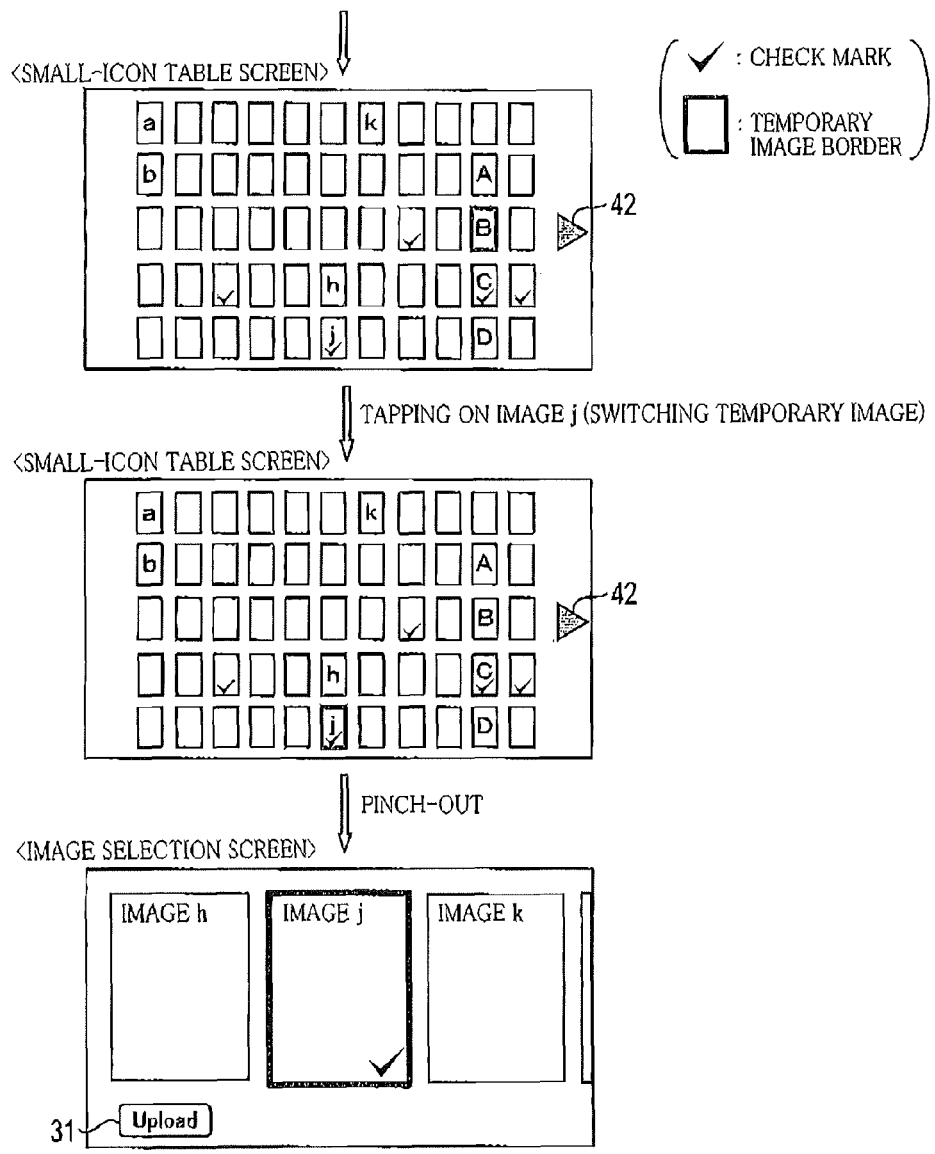
FIG. 4 is a view for explaining one example of a transition from the icon table screen to the image selection screen.

FIGS. 3 and 4 illustrate, by way of example, screens displayed before and after this scroll. The first screen from the bottom illustrated in FIG. 3 is a small-icon table screen identical to that illustrated in FIG. 2C. When the user has performed the flick operation in the right direction or the tap operation on the left arrow mark 41 on this small-icon table screen, the images are scrolled in the right direction, and the screen is switched to the small-icon table screen as the uppermost screen in FIG. 4. As is evident by the small-icon table screen as the uppermost screen in FIG. 4, the temporary image is also moved with the scroll of the images. Also, the icons based on image data near the last image data in the order of the data arrangement disappear, so that a right arrow mark 42 is displayed on a right end portion of the screen. When the user has performed the tap operation on the right arrow mark 42 or the flick operation in the left direction, the images are scrolled in the left direction, and the screen is switched back to the lowermost screen in FIG. 3.

It is noted that each icon is an image which represents the state of the selection, namely, the selected state and the unselected state in the present embodiment but may be an image or an icon containing a larger amount of information. That is, information about the image data may be further added to the image or the icon. For example, the name of the image data (or a part of the name) may be displayed on the icon, and a portion of the image based on the image data may be displayed as an icon. In a case where the icons each having a large size are used as in the large-icon table screen, reduced-size images may be displayed based on the image data as in the image selection screen. This configuration allows the user to recognize the image data by viewing the icon.

On the icon table screen, the temporary image can be switched or replaced by the tap operation of the user. For example, when the user has tapped on the icon for the image C displayed on the small-icon table screen illustrated in FIG. 2C, the temporary image is switched to the image C, and the temporary image border 32 also moved to the icon for the image C.

When the user has performed the pinch-out operation (one example of a second operation) in the state in which the icon table screen is displayed, the display is switched back to the image selection screen (see FIG. 2B). Upon this switch, the image set as the temporary image on the icon table screen displayed just before the switch is set as the temporary image also on the image selection screen and displayed at the temporary position with the temporary image border 32.

(2-4) Example of Flow of Operations for Selecting Image Data

There will be next explained, with reference to FIGS. 3 and 4, one example of a flow of operations for selecting image data in a case of the data upload function.

In the state in which the image selection screen as illustrated as the uppermost screen in FIG. 3 is displayed, the user can select or unselect the desired image data while scrolling the images as needed as described above. When the pinch-in operation is performed by the user, the screen is switched to the icon table screen. One of the three types of the icon table screens which is to be displayed in response to the switch depends upon the images being displayed on the image selection screen just before the switch and the selected image data at a time just before the switch.

The following explanation is provided assuming that the pinch-in operation has been performed in the state in which the images A-C are displayed as illustrated in the uppermost screen in FIG. 3. For example, in a case where only the image data representative of the image C is in the selected state, and the other image data is in the unselected state, the LCD 21 displays the large-icon table screen as illustrated as the second screen from the top in FIG. 3.

Also, the medium-icon table screen as illustrated as the third screen from the top in FIG. 3 is displayed in a case where, as illustrated in FIG. 2C, (i) the ninth image data and the seventeenth image data (the image j) from the images A-C in the frontward direction in the order of the data arrangement and (ii) the fifth image data and the tenth image data from the images A-C in the rearward direction in the order of the data arrangement are in the selected state among image data other than the three images A-C being displayed on the screen, for example.

More specifically, when the screen displayed on the LCD 21 is switched from the image selection screen to the icon table screen, the CPU 11 obtains the number of images n1 which is the number of images arranged from the displayed three images to an image being in the selected state which is located nearest to the displayed three images among images located in front of the displayed three images in the order of the data arrangement. The number of images n1 is nine in the above-described example. Also, the CPU 11 obtains the number of images n2 which is the number of images arranged from the displayed three images to an image being in the selected state which is located nearest to the displayed three images among images located behind the displayed three images in the order of the data arrangement. The number of images n2 is five in the above-described example.

The CPU 11 determines which number is larger between the number of images n1 and the number of images n2. The CPU 11 then doubles the larger number of images and controls the LCD 21 to display an icon table screen which can contain icons of the number N (the number of images required to be displayed) obtained by adding the number of images having been displayed on the image selection screen (three in this example) to a value obtained by doubling the larger number. Where there are two or more icon table screens each of which can contain icons of the number N, the CPU 11 controls the LCD 21 to display the icon table screen whose maximum amount of icons containable therein is the smallest among the icon table screens. In the above-described example, since the number of images n1 and the number of images n2 are nine and five, respectively, the number of images n1 is doubled, and addition of the obtained value (18) and the number of images displayed on the image selection screen (3) gives twenty one as the number of images required to be displayed N. Accordingly, the LCD 21 displays an icon table screen which can contain at least twenty-one icons. While the icon table screen which can contain at least twenty-one icons includes: the medium-icon table screen which can contain twenty-one icons; and the large-icon table screen which can contain fitly-five icons in the present embodiment, the LCD 21 displays the medium-icon table screen whose maximum amount of icons containable therein is smaller.

That is, when the screen is switched from the image selection screen containing the three images to the icon table screen in the present embodiment, the CPU 11 determines and displays the icon table screen on which at least one icon each for the image being in the selected state is displayed ahead of and behind the three images in the order of the data arrangement.

When the screen displayed on the LCD 21 is switched from the image selection screen to the icon table screen, an icon corresponding to the temporary image displayed on the image selection screen is displayed at the predetermined temporary position on the icon table screen as the temporary image. As described above, the user can use the tap operation on the icon table screen to change the temporary image.

When the pinch-in operation is performed in the state in which the large-icon table screen is displayed, the screen displayed on the LCD 21 is switched to the medium-icon table screen. When the pinch-in operation is performed in the state in which the medium-icon table screen is displayed, the screen displayed on the LCD 21 is switched to the small-icon table screen.

As illustrated in the third screen from the top in FIG. 3, in a case where the left arrow mark 41 is displayed on the medium-icon table screen, the tap operation on the left arrow mark 41 or the flick operation in the right direction scrolls the images in the right direction. In a case where the right arrow mark 42 is displayed, the tap operation on the right arrow mark 42 or the flick operation in the left direction scrolls the images in the left direction.

When the user has performed the tapping operation on the left arrow mark 41 or the flick operation in the right direction on the small-icon table screen as illustrated as the lowermost screen in FIG. 3, the images are scrolled in the right direction, so that the display is switched to a display illustrated in the uppermost screen in FIG. 4. When the user has tapped on an icon different from the icon for the image B in this state, the temporary image is switched. For example, when the user has tapped on an icon corresponding to the image j, as in the small-icon table screen illustrated as the second screen from the top in FIG. 4, the temporary image is switched to the image j, and the temporary image border is moved to the icon corresponding to the image j.

In the case where there is any icon not being displayed on each icon table screen, at least one of the arrow marks 41, 42 is displayed for displaying the icon not being displayed in the present embodiment, but the arrow marks 41, 42 may not be displayed. Also, even in a case where there are icons not being displayed, if there is no image being selected, the LCD 21 may not display the arrow marks for scrolling and displaying the icons. That is, only where there are icons not being displayed and where the image or images being selected are present among the icons, the LCD 21 may display the arrow mark or marks for scrolling and displaying the icons not being displayed.

When the user has performed a pinch-out operation (that is, when the user has pinched out with his or her fingers) after the temporary image is switched to the image j, the screen displayed on the LCD 21 is returned to the image selection screen. In this case, the image j set as the temporary image just before the switch is displayed as the temporary image at the temporary position on the image selection screen.

(3) Main Processing

Figure 5:
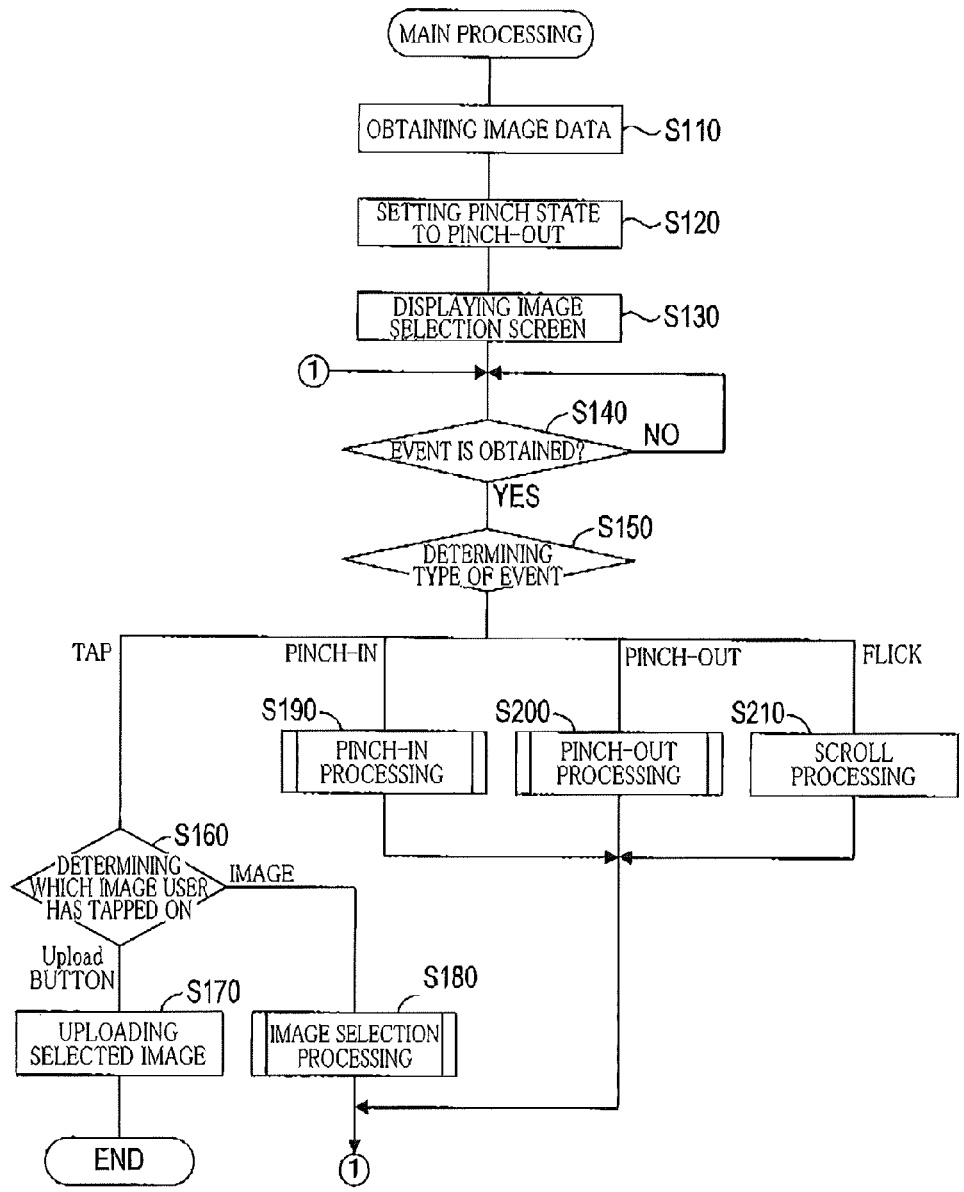
FIG. 5 is a flow chart illustrating a main processing.

There will be next explained, with reference to FIG. 5, a main processing which is executed by the CPU 11 of the MFP 1 to cause the above-described screen transition. When the user has performed a predetermined operation to execute the data upload function, the CPU 11 reads programs of the main processing from the ROM 12 or the NVRAM 14 to execute the main processing illustrated in FIG. 5. The main processing in FIG. 5 begins with S110 at which the CPU 11 obtains image data from a device storing the image data. In the present embodiment, the CPU 11 obtains image data from the memory card 18*a*.

The CPU 11 at S120 sets a pinch state to a pinch-out. The pinch state is a parameter which indicates which of the image selection screen and the icon table screen is being displayed. When the pinch state is the pinch-out, the image selection screen is being displayed, and when the pinch state is a pinch-in, the icon table screen is being displayed. It is noted that the pinch-in as the pinch state includes first-third pinch-in as will be described below.

Just after the start of the main processing, the CPU 11 at S120 sets the pinch state to the pinch-out as an initial setting. The CPU 11 at S130 controls the LCD 21 to display the image selection screen (see FIG. 2B, for example). The CPU 11 at S140 determines whether an event has been caused by an operation of the user or not. When an event has occurred, the CPU 11 at S150 determines a type of the event.

When the event is the tap operation, the CPU 11 at S160 determines which image the user has tapped on. When the user has tapped on the Upload button 31, the CPU 11 at S170 uploads the image or images being selected, and this flow ends. That is, the CPU 11 transmits all the image data being selected to the server on the cloud.

Figure 6:
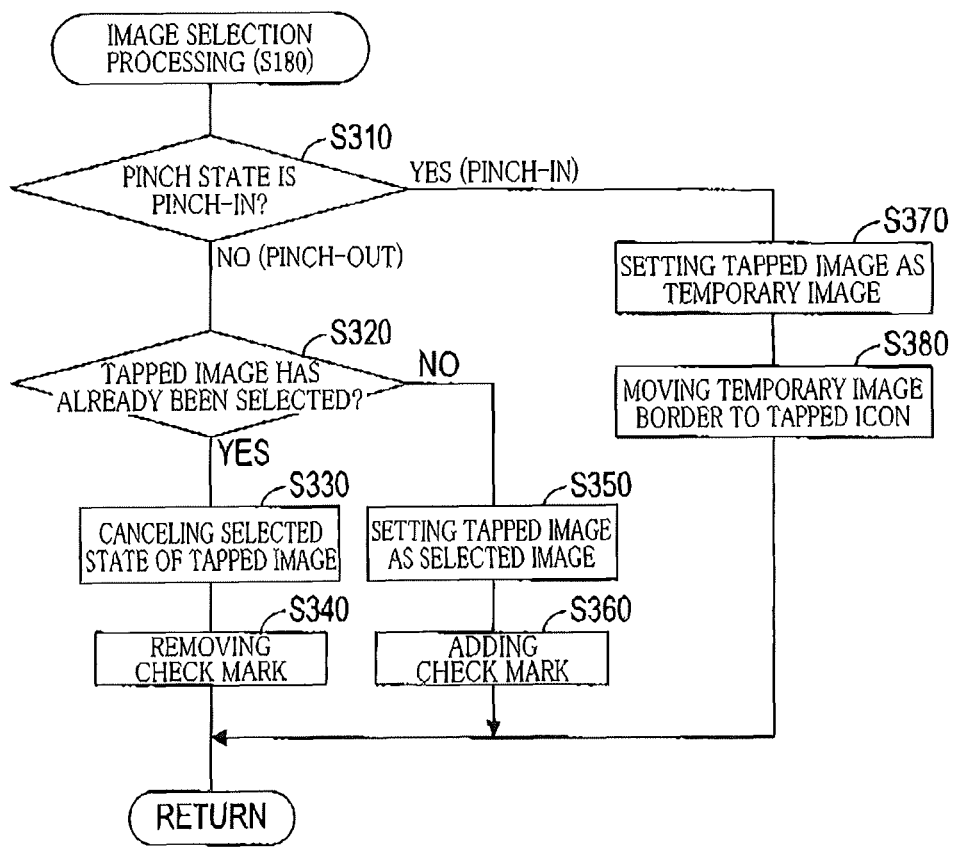
FIG. 6 is a flow chart illustrating an image selection processing at S180 in FIG. 5.

When the user has tapped on an image on the screen, the CPU 11 at S180 executes an image selection processing. The image selection processing at S180 is illustrated in FIG. 6. In the image selection processing in FIG. 6, the CPU 11 at S310 determines whether the pinch state is the pinch-in or not.

When the pinch state is the pinch-out (that is, when the image selection screen is being displayed), the CPU 11 at S320 determines whether the image the user has tapped on has already been selected or not. When the image has been selected, that is, when the user had tapped on the image having already been selected and displayed with the check mark, the CPU 11 at S330 unselects the image the user had tapped on and at S340 removes the check mark displayed on the image the user had tapped on, and this flow ends. Upon completion of the image selection processing, the flow returns to S140. When the CPU 11 at S320 determines that the image the user had tapped on has not been selected, the CPU 11 at S350 sets the image as the image being in the selected state and at S360 adds the check mark to the image the user has tapped on, and the image selection processing ends.

When the CPU 11 determines at S310 that the pinch state is the pinch-in (that is, when the icon table screen is being displayed), the CPU 11 determines that the user had tapped on an icon displayed on the icon table screen. In this case, the CPU 11 at S370 sets, as the temporary image, an image corresponding to the icon the user had tapped on and at S380 moves the temporary image border to the icon the user had tapped on, and the image selection processing ends.

Figure 7:
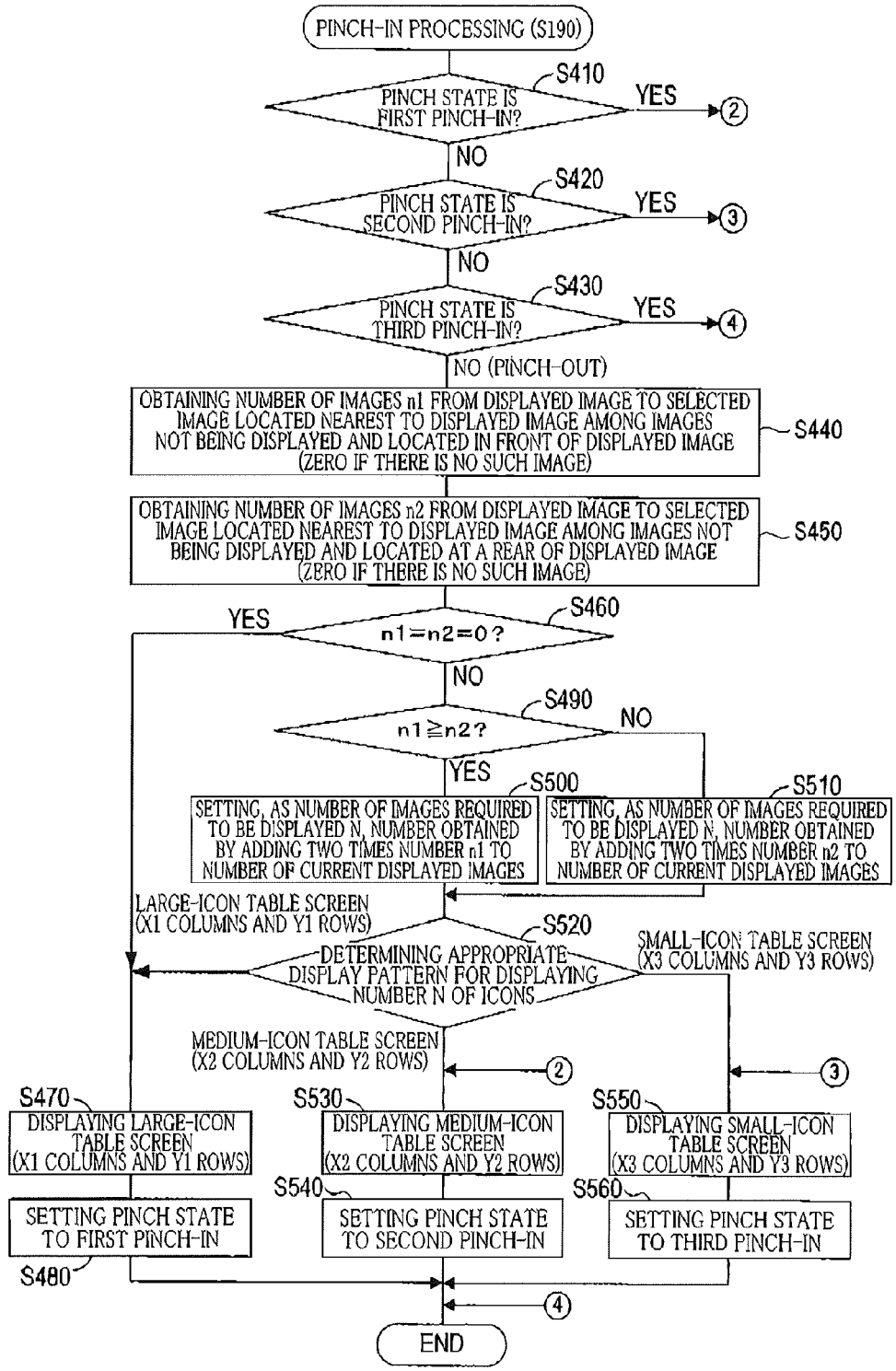
FIG. 7 is a flow chart illustrating a pinch-in processing at S190 in FIG. 5.

Returning to FIG. 5, when the event having occurred is the pinch-in operation in the event-type determination at S150, the CPU 11 at S190 executes a pinch-in processing. The pinch-in processing at S190 is illustrated in FIG. 7. In the pinch-in processing in FIG. 7, the CPU 11 at S410 determines whether the pinch state is the first pinch-in or not. The first pinch-in indicates a state in which the LCD 21 displays the large-icon table screen (see the second screen from the top in FIG. 3) among the three types of the icon table screens.

When the pinch state is the first pinch-in (that is, when the large-icon table screen is displayed on the LCD 21), the CPU 11 at S530 switches the screen displayed on the LCD 21 to the medium-icon table screen (i.e., the table of icons in the layout of X2 columns and Y2 rows). In this switch, as described above, the medium-icon table screen is displayed such that the icon corresponding to the temporary image at the timing just before the switch is disposed at the predetermined temporary position on the medium-icon table screen after the switch. Also, the CPU 11 controls the LCD 21 to display the image or images with the check mark where there is any image to which the check mark is added at S360 and display the image or images without the check mark where there is any image from which the check mark is removed at S340 or to which the check mark is not added. The CPU 11 at S540 sets the pinch state to the second pinch-in, and the pinch-in processing ends. Upon completion of the pinch-in processing, this flow returns to S140.

When the pinch state is not the first pinch-in at S410, the CPU 11 at S420 determines whether the pinch state is the second pinch-in or not. When the pinch state is the second pinch-in (that is, when the medium-icon table screen is displayed on the LCD 21), the CPU 11 at S550 switches the screen displayed on the LCD 21 to the small-icon table screen (i.e., the table of icons in the layout of X3 columns and Y3 rows). In this switch, the small-icon table screen is displayed such that the icon corresponding to the temporary image at the timing just before the switch is disposed at the predetermined temporary position on the small-icon table screen after the switch. Also, the CPU 11 controls the LCD 21 to display the image or images with the check mark where there is any image to which the check mark is added at S360 and display the image or images without the check mark where there is any image from which the check mark is removed at S340 or to which the check mark is not added. The CPU 11 at S560 sets the pinch state to the third pinch-in, and the pinch-in processing ends.

When the pinch state is not the second pinch-in at S420, the CPU 11 at S430 determines whether the pinch state is the third pinch-in or not. When the pinch state is the third pinch-in, this pinch-in processing ends. When the pinch state is not the third pinch-in, that is, when the pinch state is the pinch-out, and the image selection screen is being displayed, this flow goes to S440.

The CPU 11 at S440 obtains the number of images n1 which is the number of images arranged from three images being displayed on the image selection screen, to an image being in the selected state which is located nearest to the displayed three images among images not being displayed and located in front of the displayed three images in the order of the data arrangement. It is noted that where there is no such image, the CPU 11 sets the number of images n1 at zero. The CPU 11 at S450 obtains the number of images n2 which is the number of images arranged from three images being displayed on the image selection screen, to an image being in the selected state which is located nearest to the displayed three images among images not being displayed and located at a rear of the displayed three images in the order of the data arrangement. Also in this case, where there is no such image, the CPU 11 sets the number of images n2 at zero.

The CPU 11 at S460 determines whether each of the obtained numbers of images n1, n2 is zero or not. When each of the numbers is zero, this flow goes to S470. When at least one of the numbers is not zero, this flow goes to S490. The CPU 11 at S470 switches the screen displayed on the LCD 21 to the large-icon table screen (i.e., the table of icons in the layout of X1 columns and Y1 rows). In this switch, the large-icon table screen is displayed such that the icon corresponding to the temporary image on the image selection screen at the timing just before the switch is disposed at the predetermined temporary position on the large-icon table screen after the switch. Also, the CPU 11 controls the LCD 21 to display the image or images with the check mark where there is any image to which the check mark is added at S360, and display the image or images without the check mark where there is any image from which the check mark is removed at S340 or to which the check mark is not added. The CPU 11 at S480 sets the pinch state to the first pinch-in, and the pinch-in processing ends.

The CPU 11 at S490 determines whether the number n1 is equal to or larger than the number n2 or not. When the number n1 is equal to or larger than the number n2, the CPU 11 at S500 sets, as the number of images required to be displayed N, the number obtained by adding two times the number n1 to the number of images displayable on the current image selection screen (three in this example), and this flow goes to S520. When the number n1 is smaller than the number n2 at S490, the CPU 11 at S510 sets, as the number of images required to be displayed N, the number obtained by adding two times the number n2 to the number of images displayable on the current image selection screen, and this flow goes to S520.

The CPU 11 at S520 determines an appropriate display pattern for displaying the number N of icons. That is, the CPU 11 determines, as the appropriate display pattern, an icon table screen whose maximum amount of icons containable therein is the smallest among the icon table screen(s) on which the number N of icons can be displayed.

When the appropriate display pattern is the large-icon table screen, this flow goes to S470 at which the CPU 11 controls the LCD 21 to display the large-icon table screen. When the appropriate display pattern is the medium-icon table screen, this flow goes to S530 at which the CPU 11 controls the LCD 21 to display the medium-icon table screen. When the appropriate display pattern is the small-icon table screen, this flow goes to S550 at which the CPU 11 controls the LCD 21 to display the small-icon table screen.

Figure 8:
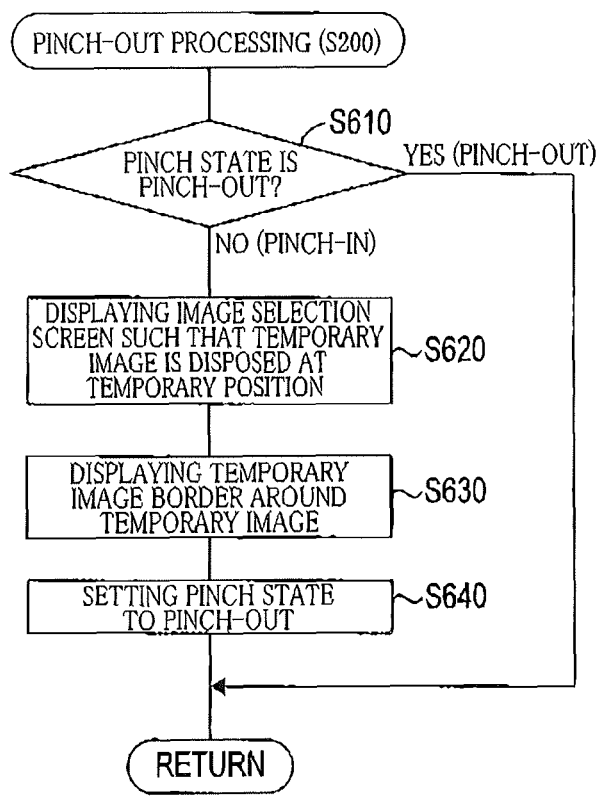
FIG. 8 is a flow chart illustrating a pinch-out processing at S200 in FIG. 5.

Returning to FIG. 5, when the event having occurred is the pinch-out operation in the event-type determination at S150, the CPU 11 at S200 executes a pinch-out processing. The pinch-out processing at S200 is illustrated in FIG. 8. In the pinch-out processing in FIG. 8, the CPU 11 at S610 determines whether the pinch state is the pinch-out or not, that is, the CPU 11 determines whether the image selection screen is being displayed or not.

When the pinch state is the pinch-out, the pinch-out processing ends, and this flow returns to S140. When the pinch state is the pinch-in (that is, when any of the icon table screens is being displayed), the CPU 11 at S620 controls the LCD 21 to display the image selection screen such that the temporary image on the current icon table screen is disposed at the predetermined temporary position on the image selection screen.

The CPU 11 at S630 controls the LCD 21 to display the temporary image border around the temporary image at the temporary position on the image selection screen. The CPU 11 at S640 sets the pinch state to the pinch-out, and this pinch-out processing ends.

Returning to FIG. 5, when the event having occurred is the flick operation in the event-type determination at S150, the CPU 11 at S210 executes a scroll processing. That is, when the flick operation is performed in the right direction, the CPU 11 scrolls the images in the right direction by an amount related to the acceleration of the input object during the flick operation, and when the flick operation is performed in the left direction, the CPU 11 scrolls the images in the left direction by an amount related to the acceleration of the input object during the flick operation.

(4) Effects in First Embodiment

In the MFP 1 according to the present embodiment as described above, even if all the images cannot be displayed on the image selection screen at a time because of too many sets of image data, the user can select desired image data while viewing the image selection screen and scrolling the images as needed. Also, the user can switch the screen displayed on the LCD 21 to the icon table screen using a simple and intuitive operation, i.e., the pinch-in, whereby the user can easily and speedily check the selected image data on the icon table screen among all the sets of image data.

Also after the screen displayed on the LCD 21 is switched to the icon table screen, the user can switch the screen displayed on the LCD 21 back to the image selection screen using a simple and intuitive operation, i.e., the pinch-out. Accordingly, the user can efficiently select image data while switching the image selection screen and the icon table screen to each other alternately.

Also, when the screen displayed on the LCD 21 is switched from the image selection screen to the icon table screen, the icon for the temporary image displayed at the temporary position on the image selection screen is displayed at the predetermined temporary position on the icon table screen with the temporary image border. Accordingly, when the screen displayed on the LCD 21 is switched from the image selection screen to the icon table screen, the user can easily recognize where the images displayed on the image selection screen are located on the icon table screen.

Also, the user can change the temporary image as needed on the icon table screen using a simple and intuitive operation, i.e., the tap operation. When the user has performed the pinch-out operation to switch the screen displayed on the LCD 21 back to the image selection screen after changing the temporary image, the changed temporary image is displayed at the temporary position on the image selection screen. Accordingly, the user can operate the icon table screen to switch the images to be displayed on the image selection screen to desired images. Also, in a case where the user wants to check which image data an icon on the icon table screen corresponds to, the user can check it by changing the temporary image to the icon and switching the screen displayed on the LCD 21 back to the image selection screen.

Also, the plurality of types of the icon table screens are prepared (the three icon table screens in the present embodiment), and when the screen displayed on the LCD 21 is switched from the image selection screen to the icon table screen, an appropriate one of the icon table screens is displayed according to a situation with regard to selection of image data. Also, even in the case where the large-icon table screen is displayed, the user can perform the pinch-in operation to switch the screen displayed on the LCD 21 to the medium-icon table screen and the small-icon table screen stepwise, whereby the user can increase the number of icons on the icon table screen. This applies to a case where the medium-icon table screen is displayed at first.

In view of the above, the CPU 11 can be considered to execute a first-screen display processing at S130. The CPU 11 can be considered to execute a data setting processing at S330 and S350. The CPU 11 can be considered to execute a second-screen display processing at S470. The CPU 11 can be considered to execute an image switch processing at S210. The CPU 11 can be considered to execute a screen return processing at S620. The CPU 11 can be considered to execute a reference-position changing processing at S370. The CPU 11 can be considered to execute a second-screen display number changing processing at S530.

Alternative Embodiments

The user can determine various settings as needed such as the number of images to be displayed on the image selection screen, elements to be displayed on the image selection screen, a display and an arrangement of the images, and a direction of scrolling of the images. Likewise, the user can determine various settings as needed for the icon table screen, and examples of the settings include the number of icons, elements to be displayed, the size and shape of each icon, a display and an arrangement of the icons, and a direction of scrolling of the icons.

The user can appropriately determine where the temporary image is to be displayed on each screen (that is, the user can determine which position is the temporary position).

When the pinch-in operation is performed on a desired image on the image selection screen, an icon corresponding to the image may be disposed at a predetermined position on the icon table screen. In this case, the icon may be automatically set as the temporary image.

When the pinch-out operation is performed on an icon on the icon table screen, an image corresponding to the icon may be displayed on the image selection screen. In this case, the image corresponding to the icon may be automatically set as the temporary image.

The pinch-in and the pinch-out are merely examples of the operation or gesture for switching the screen, and other types of operations may be used. Likewise, the flick operation is merely one example of the operation or gesture for scrolling the images or the screen. Also, the method of the user input is not limited to the contact operation on the touch panel 22, and various user interfaces may be used to accept various operations such as the switch of the screen, the scroll of the images or the screen, the setting of the selected and unselected states, and the change of the temporary image. Examples of the user interfaces include: a user interface which can accept a contact operation on an area other than the touch panel 22; and a user interface which can accept a non-contact operation of the input object which is performed without a touch on the touch panel 22 or other similar devices. One example of the non-contact operation is a gesture. For example, the MFP 1 is equipped with an image taking device such as a compact camera which can shoot a movement or a gesture of a part of a user's body, and when the user has made a specific gesture, the MFP 1 recognizes the gesture and performs a screen processing corresponding to the gesture such as a switch or a scroll of a screen.

While the three types of the icon table screens are used in the above-described embodiment, greater or less than three types of the icon table screens may be used.

In this MFP 1, it is possible to predetermine which icon table screen appears first when the screen displayed on the LCD 21 is switched from the image selection screen to the icon table screen. For example, the CPU 11 may control the LCD 21 to display icons respectively corresponding to all the images being in the selected state. In contrast, the CPU 11 may control the LCD 21 to always display the large-icon table screen first regardless of the situation with regard to selection of image data. Also, the icon table screen is not limited to a predetermined one or a plurality of types of icon table screens. For example, the CPU 11 may calculate and display an appropriate icon table screen (using icons of the appropriate number, size, and/or arrangement, for example) according to the situation with regard to selection of image data upon the switch of the screen and other various conditions. The number of icons on the icon table screen may be increased stepwise in a process of the pinch-in operation, i.e., in a process of narrowing a distance between two forgers of the user.

The present invention is applicable not only to the MFP 1 but also to any device including a display device. While data such as image data to be displayed on the display device is read from the memory card 18*a* in the present embodiment, data to be displayed may be read from various storage media each containing an internal memory (including storage media connected to a network).

What is claimed is:

1. An image display control apparatus comprising:
   a storage configured to store a plurality of sets of data;
   a user-input accepting device superposed on a display region of a display device and configured to accept a user input; and
   a controller configured to execute:
      a first-screen display processing in which the controller controls the display device to display a first screen on which at least two of a plurality of first data relating images respectively corresponding to the plurality of sets of data stored in the storage are arranged in a set order;
      a data setting processing in which, when at least one first data relating image of the plurality of first data relating images being displayed on the first screen is selected using the user-input accepting device, the controller performs one of setting, as data to be output, data corresponding to the selected at least one first data relating image and excluding, from the data to be output, the data corresponding to the selected at least one first data relating image;
      a second-screen display processing in which, when a first operation is accepted by the user-input accepting device during display of the first screen, the controller controls the display device to replace the first screen with a second screen on which at least three of a plurality of second data relating images respectively corresponding to the plurality of sets of data stored in the storage are arranged in the set order, the plurality of second data relating images each comprising a display area which is less in size than that of each of the plurality of first data relating images, the number of the at least three of the plurality of second data relating images to be displayed on the second screen being greater than that of the plurality of first data relating images to be displayed on the first screen; and
   wherein the controller controls the display device to:
      attach a first indication to a particular second data relating image on the second screen when the particular second data relating image is selected among the at least three of the plurality of second data relating image, and
   replace the second screen with the first screen and display the at least two of the plurality of first data relating images including a particular first data relating image with the first indication on the first screen in response to an acceptance of a pinch-out operation accepted by the user-input accepting device and inputted to any part of the display region of the display device during the display of the second screen, the particular first data relating image with the first indication corresponding to the particular second data relating image with the first indication.

2. The image display control apparatus according to claim 1, wherein the controller is configured to further execute an image switch processing in which, when an image switch operation for commanding a switch of the plurality of first data relating images being displayed on the first screen is accepted by the user-input accepting device during display of the first screen, the controller switches the plurality of first data relating images to be displayed on the first screen.

3. The image display control apparatus according to claim 2, wherein the controller is configured to execute the image switch processing in which, when an image switch operation for commanding a switch of the plurality of second data relating images being displayed on the second screen is accepted by the user-input accepting device during display of the second screen, the controller switches the plurality of second data relating images to be displayed on the second screen.

4. The image display control apparatus according to claim 1, wherein the controller is configured to execute the second-screen display processing in which the controller controls the display device to display the second screen such that the particular second data relating image is displayed at a second reference position on the second screen, the particular second data relating image corresponding to the particular first data relating image which is displayed at a first reference position on the first screen when the first operation is accepted by the user-input accepting device during display of the first screen.

5. The image display control apparatus according to claim 4, wherein the controller is configured to further execute a reference-position changing processing in which the controller changes the second reference position on the second screen when a reference-position changing operation for changing the second reference position is accepted by the user-input accepting device during display of the second screen.

6. The image display control apparatus according to claim 5, wherein the controller is configured to further execute the reference-position changing processing in which, when another second data relating image of the at least three of the plurality of second data relating images displayed on the second screen is selected using the user-input accepting device, the controller sets a position at which the selected another second data relating image is displayed, as the second reference position.

7. The image display control apparatus according to claim 1, wherein the controller is configured to execute the data setting processing in which the controller sets, as data to be transmitted to an external server, the data set in the data setting processing as the data to be output.

8. The image display control apparatus according to claim 1, wherein the controller is configured to execute the data setting processing in which the controller sets, as data to be recorded by an image recording apparatus, the data set in the data setting processing as the data to be output.

9. The image display control apparatus according to claim 1, wherein the user-input accepting device comprises a touch panel, and
   wherein the user input accepted by the user-input accepting device is at least one of (i) a contact operation in which an input object contacts the touch panel and (ii) a non-contact operation in which the input object does not contact the touch panel.

10. The image display control apparatus according to claim 1, wherein the user-input accepting device comprises a touch panel, and
   wherein the first operation is a pinch-in operation on the touch panel.

11. The image display control apparatus according to claim 1,
   wherein the controller is configured to execute the first-screen display processing and the second-screen display processing in each of which the controller controls the display device to display a corresponding one of the first screen and the second screen on which corresponding ones of the at least two of the plurality of first data relating images and the at least three of the plurality of second data relating images are arranged in at least one row and at least one column in the set order, and
   wherein a combination of a number of rows and a number of columns on the first screen differs from a combination of a number of rows and a number of columns on the second screen.

12. The image display control apparatus according to claim 1, wherein the controller is configured to execute the second-screen display processing in which the controller is capable of controlling the display device to display the plurality of second data relating images in a plurality of combinations of the number of rows and the number of columns on the second screen,
   wherein the controller is configured to execute the second-screen display processing in which the controller controls the display device to display a first display number of the at least three of the plurality of second data relating images in one of the plurality of combinations, the first display number being determined based on settings of data of the plurality of sets of data as the data to be output, the data of the plurality of sets of data being different from the at least two sets of data corresponding to the at least two of the plurality of first data relating images displayed on the first screen, and
   wherein the controller is configured to further execute a second-screen display number changing processing in which when the first operation is accepted by the user-input accepting device during display of the second screen, the controller controls the display device to display a second display number of the at least three of the plurality of second data relating images in another of the plurality of combinations, the second display number being a next greater number than the first display number among the plurality of combinations.

13. The image display control apparatus according to claim 1, wherein the controller is further configured to execute a second indication attaching processing in which the controller controls the display device to attach a second indication to at least one of the plurality of first data relating images when the at least one of the plurality of first data relating images is set as the data to be output in the data setting processing.

14. The image display control apparatus according to claim 1, wherein, the controller controls the display device to replace the first screen with one of the second screen and a third screen on which at least four of plurality of third data relating images respectively corresponding to the plurality sets of data stored in the storage are arranged in the set order, the plurality of third data relating images each comprises a display area which is less in size than that of each of the plurality of second data relating images, the number of the at least four of the plurality of third data relating images to be displayed on the third screen being greater than that of the plurality of second data relating images to be displayed on the second screen,
   wherein, in a case where at least three first data relating images are selected in the data setting processing and in a state in which both of a preceding one of the selected three first data relating images, which precedes at least one selected first data relating image being displayed on the first screen, and a succeeding one of the selected first data relating image are not displayed on the first screen, which succeeds at least one selected first data relating image,
   the controller configured to execute:
      a determination processing, in response to an acceptance of a pinch-in operation as the first operation accepted by the user-input accepting device, in which the controller determine, whether all of (a) a selected at least one second data relating image of the at least three second data relating images, (b) a selected preceding one second data relating image of the at least three second relating images, preceding to the selected at least one second data relating image, and (c) a selected succeeding one second data relating image of the at least three second data relating images, succeeding to at least one selected second data relating image, are displayed on the second screen, wherein the selected at least one second data relating image, the selected preceding second data relating image and the selected succeeding one second data relating image respectively corresponding to the selected at least one first data relating image being displayed on the first screen, the selected preceding one first data relating image and the selected succeeding one first data relating image,
   wherein, when it is determined that all of (a) the selected at least one second data relating image, (b) the selected preceding one second data relating image and (c) the selected succeeding one second data relating image are displayed on the second screen, the controller replaces the first screen with the second screen and displays the all of the selected at least one second data relating image, the selected preceding one second data relating image and the selected one succeeding second data relating image on the second screen, and
   wherein, when it is determined that at least one of (a) the selected at least one second data relating image, (b) the selected preceding one second data relating image and (c) the selected succeeding one second data relating image is not displayed on the second screen, the controller replaces the first screen with the third screen and displays all of (i) a selected at least one of third data relating image of the at least four third data relating images, (ii) a selected preceding one third data relating image and (iii) a selected succeeding one third data relating image on the third screen, wherein, the selected at least one third data relating image, the selected preceding third data relating image and the selected succeeding one third data relating image respectively corresponding to the selected at least one first data relating image being displayed on the first screen, the selected preceding one first data relating image and the selected succeeding one first data relating image.

15. An image display control method for an image display control apparatus, the image display control apparatus comprising a storage configured to store a plurality of sets of data;

and a user-input accepting device superposed on a display region of a display device and configured to accept a user input, the image display control method comprising:

controlling the display device to display a first screen on which at least two of a plurality of first data relating images respectively corresponding to the plurality of sets of data stored in the storage are arranged in a set order;

when at least one first data relating image of the plurality of first data relating images being displayed on the first screen is selected using the user-input accepting device, performing one of setting, as data to be output, data corresponding to the selected at least one first data relating image and excluding, from the data to be output, the data corresponding to the selected at least one first data relating image;

when a first operation is accepted by the user-input accepting device during display of the first screen, controlling the display device to replace the first screen with a second screen on which at least three of a plurality of second data relating images respectively corresponding to the plurality of sets of data stored in the storage are arranged in the set order, the plurality of second data relating images each comprising a display area which is less in size than that of each of the plurality of first data relating images, the number of the at least three of the plurality of second data relating images to be displayed on the second screen being greater than that of the plurality of first data relating images to be displayed on the first screen;

controlling the display device to attach a first indication to a particular second data relating image on the second screen when the particular second data relating image is selected among the at least three of the plurality of second data relating images; and controlling the display device to replace the second screen with the first screen and display the at least two of the plurality of first data relating images including a particular first data relating image with the first indication on the first screen in response to an acceptance of a pinch-out operation accepted by the user-input accepting device and inputted to any part of the display region of the display device during the display of the second screen, the particular first data relating image with the first indication corresponding to the particular second data relating image with the first indication.

16. A non-transitory storage medium storing a plurality of instructions executable by a computer of an image display control apparatus, the image display control apparatus comprising: a storage configured to store a plurality of sets of data; and a user-input accepting device superposed on a display region of the display device and configured to accept a user input, the plurality of instructions, when executed by the computer, causing the image display control apparatus to execute:

a first-screen display processing in which the computer controls the display device to display a first screen on which at least two of a plurality of first data relating images respectively corresponding to the plurality of sets of data stored in the storage are arranged in a set order;

a data setting processing in which, when at least one first data relating image of the plurality of first data relating images being displayed on the first screen is selected using the user-input accepting device, the controller performs one of setting, as data to be output, data corresponding to the selected at least one first data relating image and excluding, from the data to be output, the data corresponding to the selected at least one first data relating image; and a second-screen display processing in which, when a first operation is accepted by the user-input accepting device during display of the first screen, the computer controls the display device to replace the first screen with a second screen on which at least three of a plurality of second data relating images respectively corresponding to the plurality of sets of data stored in the storage are arranged in the set order, the plurality of second data relating images each comprising a display area which is less in size than that of each of the plurality of first data relating images, the number of the at least three of the plurality of second data relating images to be displayed on the second screen being greater than that of the plurality of first data relating images to be displayed on the first screen wherein the plurality of instructions, when executed by the computer, further cause the image display control apparatus to execute:

controlling the display device to attach a first indication to a particular second data relating image on the second screen when the particular second data relating image is selected among the at least three of the plurality of second data relating images; and controlling the display device to replace the second screen with the first screen and display the at least two of the plurality of first data relating images including a particular first data relating image with the first indication on the first screen in response to an acceptance of a pinch-out operation accepted by the user-input accepting device and inputted to any part of the display region of the display device during the display of the second screen, the particular first data relating image with the first indication corresponding to the particular second data relating image with the first indication.

* * * * *